United States Patent
Gaillardon et al.

(10) Patent No.: US 10,394,988 B2
(45) Date of Patent: Aug. 27, 2019

(54) MAJORITY LOGIC SYNTHESIS

(71) Applicant: ECOLE POLYTECHNIQUE FEDERALE DE LAUSANNE (EPFL), Lausanne (CH)

(72) Inventors: Pierre-Emmanuel Julien Gaillardon, Romans-sur-Isère (FR); Luca Gaetano Amarù, Jouxtens-Mézery (CH); Giovanni De Micheli, Lausanne (CH)

(73) Assignee: ECOLE POLYTECHNIQUE FEDERALE DE LAUSANNE (EPFL), Lausanne (CH)

( * ) Notice: Subject to any disclaimer, the term of this patent is extended or adjusted under 35 U.S.C. 154(b) by 0 days.

(21) Appl. No.: 15/118,490

(22) PCT Filed: Feb. 20, 2014

(86) PCT No.: PCT/IB2014/059133
§ 371 (c)(1),
(2) Date: Aug. 12, 2016

(87) PCT Pub. No.: WO2015/124963
PCT Pub. Date: Aug. 27, 2015

(65) Prior Publication Data
US 2017/0177750 A1 Jun. 22, 2017

(51) Int. Cl.
*G06F 17/50* (2006.01)
*H03K 19/003* (2006.01)
*H03K 19/01* (2006.01)

(52) U.S. Cl.
CPC ........ *G06F 17/505* (2013.01); *G06F 17/5068* (2013.01); *G06F 17/5081* (2013.01);
(Continued)

(58) Field of Classification Search
None
See application file for complete search history.

(56) References Cited

PUBLICATIONS

A. E. Negrin, "Synthesis of Practical Three-Input Majority Logic Networks," Correspondence, IEEE Transactions on Electronic Computers, Jun. 1964, pp. 296-299.*

(Continued)

*Primary Examiner* — Leigh M Garbowski
(74) *Attorney, Agent, or Firm* — Andre Roland S.A.; Nikolaus Schibli

(57) ABSTRACT

A method for optimizing an implementation of a logic circuit, comprising steps of providing an interpretation of the logic circuit in terms of 3 Boolean variable majority operators M, with each of the majority operators being a function of a plurality of variables that returns a logic value assumed by more than half of the plurality of variables, and a single Boolean variable complementation operator '. The method further comprises providing a commutativity, a majority ($\Omega$.M), an associativity ($\Omega$.A), a distributivity ($\Omega$.D), an inverter propagation ($\Omega$.I), a relevance ($\Psi$.R), a complementary associativity ($\Psi$.C), and a substitution ($\Psi$.S) transformation; and combining the $\Omega$.M, $\Omega$.C, $\Omega$.A, $\Omega$.D, $\Omega$.I, $\Psi$.R, $\Psi$.C and $\Psi$.S transformations to reduce an area of the logic circuit via (i) a reshaping procedure consisting of the $\Omega$.A, $\Omega$.C, $\Omega$.D, $\Omega$.I, $\Psi$.R, $\Psi$.S and $\Psi$.C transformations, applied either left-to-right or right-to-left moving identical or complemented variables in neighbor locations of the logic circuit, (ii) an elimination procedure consisting of the $\Omega$.M transformation, applied left-to-right, and the $\Omega$.D transformation, applied right-to-left, that simplify redundant operators, or (iii) an iteration of steps (i) and (ii) till a reduction in area is achieved.

12 Claims, 4 Drawing Sheets

(52) U.S. Cl.
CPC .......... *G06F 17/50* (2013.01); *G06F 2217/08* (2013.01); *G06F 2217/16* (2013.01); *G06F 2217/78* (2013.01); *G06F 2217/84* (2013.01); *H03K 19/00323* (2013.01); *H03K 19/01* (2013.01)

(56) References Cited

PUBLICATIONS

O. A. Horna, "Majority-Logic Synthesis," Correspondence, IEEE Transactions on Electronic Computers, Apr. 1963, pp. 131-132.*

Akers, S. B. (Oct. 1962). Synthesis of combinational logic using three-input majority gates. In Switching Circuit Theory and Logical Design, 1962. SWCT 1962. Proceedings of the Third Annual Symposium on (pp. 149-158). IEEE.

Kong, K., Shang, Y., & Lu, R. (2010). An optimized majority logic synthesis methodology for quantum-dot cellular automata. IEEE Transactions on Nanotechnology, 9(2), 170-183.

Riseman, E. M. (1967). A realization algorithm using three-input majority elements. IEEE Transactions on Electronic Computers, (4), 456-462.

Zhang, R., Gupta, P., & Jha, N. K. (2007). Majority and minority network synthesis with application to QCA-, SET-, and TPL-based nanotechnologies. IEEE Transactions on Computer-Aided Design of Integrated Circuits and Systems, 26(7), 1233-1245.

ABC: A System for Sequential Synthesis and Verification, Alan Mishchenko, Jul. 2005, retrieved from www.eecs.berkeley.edu/~alanmi/abc/ on Aug. 11, 2016, 16 pages.

Abramsky, Samson. "Domain theory in logical form." Annals of pure and applied logic 51.1-2 (1991): 1-77.

Bernstein, Kerry, et al. "Device and architecture outlook for beyond CMOS switches." Proceedings of the IEEE 98.12 (2010): 2169-2184.

Birkhoff, G., & Abbott, J. C. (1970). Trends in lattice theory. J. C. Abbott (Ed.). Van Nostrand Reinhold Company, pp. 173-210.

Brayton, R., & Mishchenko, A. (Jul. 2010). ABC: An academic industrial-strength verification tool. In International Conference on Computer Aided Verification (pp. 24-40). Springer Berlin Heidelberg.

Brayton, Robert K., et al. "MIS: A multiple-level logic optimization system." IEEE Transactions on Computer-Aided Design of Integrated Circuits and Systems 6.6 (1987): 1062-1081.

Bryant, Randal E. "Graph-based algorithms for boolean function manipulation." IEEE Transactions on computers 100.8 (1986): 677-691.

Chen, Kevin J., Koichi Maezawa, and Masafumi Yamamoto. "InP-based high-performance monostable-bistable transition logic elements (MOBILEs) using integrated multiple-input resonant-tunneling devices." IEEE Electron Device Letters 17.3 (1996): 127-129.

De Marchi, Michele, et al. "Polarity control in double-gate, gate-all-around vertically stacked silicon nanowire FETs." Electron Devices Meeting (IEDM), 2012 IEEE International. IEEE, 2012, pp. 183-186.

G. Birkhoff, A ternary operation in distributive lattices, Bull. of the Amer. Math. Soc., 53 (1): 749-752, 1947.

International Search Report of PCT/IB2014/059133 dated Oct. 23, 2014.

Isbell, J. R. (1980). Median algebra. Transactions of the American Mathematical Society, 260(2), 319-362.

M. Stone, The Theory of Representations of Boolean Algebras, Trans. Amer. Math. Soc. 40: 37-111, 1936.

Predictive Technology Model (PTM), 2007, Nanoscale Integration and Modelling (NIMO) group, retrieved from ptm.asu.edu on Aug. 11, 2016, 2 pages.

Rudell, Richard L. Multiple-valued logic minimization for PLA synthesis. No. UCB/ERL-M86/65. California Univ Berkeley Electronics Research Lab, 1986, pp. 1-126.

Sentovich, E. M., Singh, K. J., Lavagno, L., Moon, C., Murgai, R., Saldanha, A., . . . & Sangiovanni-Vincentelli, A. (1992). SIS: A system for sequential circuit synthesis, pp. 1-45.

Tougaw, P. Douglas, and Craig S. Lent. "Logical devices implemented using quantum cellular automata." Journal of Applied physics 75.3 (1994): 1818-1825.

Written Opinion of the International Search Authority dated Oct. 23, 2014.

Yang, Congguang, and Maciej Ciesielski. "BDS: a BDD-based logic optimization system." IEEE Transactions on Computer-Aided Design of Integrated Circuits and Systems 21.7 (2002): 866-876.

\* cited by examiner

| Logic Optimization | | MIG | | | | AIG | | | | BDD Decomposition | | | |
|---|---|---|---|---|---|---|---|---|---|---|---|---|---|
| Benchmarks | I/O | Size | Depth | Activity | Time | Size | Depth | Activity | Time | Size | Depth | Activity | Time |
| C1355 | 41/32 | 481 | 18 | 133.80 | 0.1 | 392 | 18 | 126.36 | 0.1 | 315 | 19 | 109.33 | 0.2 |
| C1908 | 33/25 | 450 | 23 | 124.98 | 0.1 | 363 | 25 | 159.08 | 0.1 | 414 | 31 | 169.68 | 0.4 |
| C6288 | 32/32 | 2357 | 86 | 704.62 | 0.2 | 2045 | 94 | 797.91 | 0.3 | 2187 | 98 | 883.13 | 0.3 |
| bigkey | 487/421 | 4390 | 9 | 780.02 | 0.7 | 4834 | 9 | 846.57 | 0.5 | 4503 | 14 | 822.76 | 3.2 |
| my_adder | 33/17 | 265 | 19 | 38.15 | 0.1 | 197 | 33 | 49.86 | 0.1 | 211 | 37 | 64.83 | 0.3 |
| cla | 129/65 | 1028 | 24 | 363.57 | 0.2 | 902 | 38 | 329.17 | 0.1 | 918 | 39 | 317.44 | 0.3 |
| dsip | 75/16 | 1441 | 21 | 280.12 | 0.1 | 1116 | 30 | 264.92 | 0.1 | 1626 | 39 | 303.70 | 1.6 |
| b9 | 41/21 | 97 | 6 | 16.95 | 0.1 | 84 | 7 | 16.65 | 0.1 | 98 | 9 | 17.20 | 0.1 |
| count | 35/16 | 176 | 7 | 32.77 | 0.1 | 127 | 19 | 130.87 | 0.1 | 134 | 17 | 190.5 | 0.1 |
| alu4 | 14/8 | 1380 | 14 | 237.38 | 0.1 | 1421 | 14 | 240.52 | 0.1 | 1773 | 27 | 340.33 | 0.5 |
| dma | 416/115 | 12499 | 42 | 3624.38 | 1.2 | 12928 | 46 | 3712.38 | 1.1 | N/A | N/A | N/A | N/A |
| macbha | 128/120 | 1174 | 101 | 209.52 | 0.3 | 1004 | 125 | 164.49 | 0.2 | 1167 | 111 | 188.29 | 0.9 |
| s38417 | 1464/1571 | 8200 | 22 | 1082.78 | 0.8 | 8053 | 25 | 1854.26 | 1.0 | 8210 | 28 | 1089.22 | 4.1 |
| mixer3 | 14/14 | 1323 | 13 | 231.09 | 0.2 | 1274 | 14 | 209.27 | 0.1 | 1223 | 16 | 198.71 | 0.4 |
| Average | 2121/76 | 2305.1 | 28.9 | 630.42 | 0.30 | 2477.1 | 38.3 | 628.52 | 0.28 | 2386.1 | 37.9 | 650.86 | 0.95 |

FIG. 5A

| Logic Synthesis Benchmarks | | MIG + Tech. Map. | | | AIG + Tech. Map. | | | Commercial Synthesis Tool | | |
|---|---|---|---|---|---|---|---|---|---|---|
| | I/O | A (μm²) | D (ns) | P (μW) | A (μm²) | D (ns) | P (μW) | A (μm²) | D (ns) | P (μW) |
| C1355 | 41/32 | 56.34 | 0.74 | 220.08 | 56.27 | 0.76 | 203.55 | 56.34 | 0.76 | 205.54 |
| C1908 | 33/25 | 44.72 | 0.78 | 132.98 | 53.47 | 1.06 | 135.07 | 53.54 | 0.99 | 135.96 |
| C6288 | 32/32 | 361.47 | 3.18 | 1004.30 | 354.54 | 3.44 | 1022.21 | 343.41 | 3.44 | 1742.20 |
| hyp(a) | 467/421 | 388.57 | 0.82 | 722.08 | 541.24 | 0.73 | 961.06 | 538.09 | 0.70 | 1010.32 |
| my_adder | 33/17 | 22.68 | 1.19 | 36.17 | 23.23 | 1.08 | 41.10 | 23.31 | 1.08 | 41.21 |
| cla | 129/65 | 149.32 | 1.42 | 398.34 | 139.02 | 2.32 | 355.47 | 139.50 | 2.33 | 350.53 |
| dalu | 75/16 | 116.34 | 1.07 | 169.42 | 103.25 | 0.94 | 145.10 | 100.97 | 1.09 | 147.98 |
| i9 | 41/21 | 12.08 | 0.22 | 19.75 | 13.72 | 0.22 | 20.67 | 14.49 | 0.26 | 23.06 |
| count | 35/16 | 20.16 | 0.91 | 28.04 | 18.76 | 1.07 | 24.87 | 18.76 | 1.07 | 24.87 |
| alu4 | 14/8 | 150.15 | 0.63 | 225.16 | 254.80 | 0.67 | 348.71 | 220.25 | 0.69 | 343.62 |
| cmu | 416/115 | 888.79 | 1.59 | 1006.65 | 1100.80 | 1.69 | 2101.77 | 1315.02 | 1.62 | 2508.00 |
| mm30a | 124/120 | 130.41 | 2.12 | 210.95 | 148.12 | 4.71 | 240.28 | 164.56 | 3.35 | 265.29 |
| s38417 | 1494/1571 | 1287.44 | 1.20 | 257.00 | 1268.05 | 1.34 | 2559.34 | 1307.59 | 1.43 | 2599.28 |
| misex3 | 14/14 | 159.88 | 0.60 | 234.09 | 291.40 | 0.92 | 379.62 | 207.48 | 0.73 | 294.62 |
| Average | 212/126 | 270.67 | 1.18 | 600.16 | 317.71 | 1.53 | 679.07 | 322.95 | 1.43 | 700.68 |

FIG. 5B

MAJORITY LOGIC SYNTHESIS

CROSS REFERENCE TO RELATED APPLICATIONS

The present application is a U.S. national stage application of International patent application PCT/IB2014/059133 filed on Feb. 20, 2014 that designated the United States, the contents of thereof being herewith incorporated by reference in its entirety.

TECHNICAL FIELD

The invention concerns logic synthesis tools that are used to improve the performance of digital integrated circuits.

BACKGROUND

The performance of today's digital integrated circuits largely depends on the capabilities of logic synthesis tools. In this context, efficient representation and optimization of Boolean functions are key features. Some data structures and algorithms have been proposed for these tasks (see references [1]-[8]). Most of them consider, as basis operations, inversion (INV), conjunction (AND), disjunction (OR) (see references [2]-[5]) and if-then-else (MUX) (see references [6], [7]). Other Boolean operations are derived by composition. Even though existing design automation tools, based on original optimization techniques (see references [1]-[8]), produce good results and handle large circuits, the possibility to push further the efficacy of logic synthesis continues to be of paramount interest to the Electronic Design Automation (EDA) community.

With this aim in mind, the invention approaches the logic optimization problem from a new angle.

SUMMARY OF INVENTION

The present invention proposes a novel method to represent and optimize a logic circuit.

Accordingly, in a first aspect the invention provide a method for optimizing an implementation of a logic circuit, comprising providing an interpretation of the logic circuit in terms of 3 Boolean variable majority operators M, with each of the majority operators being a function of a plurality of variables that returns a logic value assumed by more than half of the plurality of variables, and a single Boolean variable complementation operator '. The method further comprises providing a commutativity transformation defined by $M(x,y,z)=M(y,x,z)=M(z,y,x)$, wherein $x,y,z$ are Boolean variables; providing a majority transformation ($\Omega$.M) defined by if($x==y$) then $M(x,y,z)=x$ else if($x==y'$) then $M(x,y,z)=z$, wherein $y'$ is the Boolean complement of $y$; providing an associativity transformation ($\Omega$.A) defined by $M(x,u,M(y,u,z))=M(z,u,M(y,u,x))$, wherein also $u$ is a Boolean variable; providing a distributivity transformation ($\Omega$.D) defined by $M(x,y,M(u,v,z))=M(M(x,y,u),M(x,y,v),z)$, wherein also $z$ and $v$ are Boolean variables; providing an inverter propagation transformation ($\Omega$.I) defined by $(M(x,y,z))'=M(x',y',z')$, wherein $x'$ is the Boolean complement of $x$ and $z'$ is the Boolean complement of $z$; providing a relevance transformation ($\Psi$.R) defined by $M(x,y,z)=M(x,y,z_{x/y'})$, wherein the symbol $z_{x/y'}$ represents the logic circuit for variable $z$ wherein the variable $x$ is substituted by variable $y'$ in all its appearance in the circuit of $z$; providing a complementary associativity transformation ($\Psi$.C) defined by $M(x,u,M(y,u',z))=M(x,u,M(y,x,z))$, wherein $u'$ is the Boolean complement of $u$; providing a substitution transformation ($\Psi$.S) defined by $M(x,y,z)=M(v,M(v',M_{v/u}(x,y,z),u),M(v',M_{v/u'}(x,y,z),u'))$, wherein $v'$ is the Boolean complement of $v$, $M_{v/u}(x,y,z)$ represents the logic circuit for $M(x,y,z)$ having the variable $v$ substituted by the variable $u$ in all its appearance in the circuit of $M(x,y,z)$ and $M_{v/u'}(x,y,z)$ represents the logic circuit for $M(x,y,z)$ having variable $v$ is substituted by variable $u'$ in all its appearance in the circuit of $M(x,y,z)$. The $\Omega$.M, $\Omega$.C, $\Omega$.A, $\Omega$.D, $\Omega$.I, $\Psi$.R, $\Psi$.C and $\Psi$.S transformations are combined to reduce an area of the logic circuit via (i) a reshaping procedure consisting of the $\Omega$.A, $\Omega$.C, $\Omega$.D, $\Omega$.I, $\Psi$.R, $\Psi$.S and $\Psi$.C transformations, applied either left-to-right or right-to-left moving identical or complemented variables in neighbor locations of the logic circuit, (ii) an elimination procedure consisting of the $\Omega$.M transformation, applied left-to-right, and the $\Omega$.D transformation, applied right-to-left, that simplify redundant operators, or (iii) an iteration of steps (i) and (ii) till a reduction in area is achieved.

In a second aspect the invention provide a method for optimizing an implementation of a logic circuit, comprising providing an interpretation of the logic circuit in terms of 3 Boolean variable majority operators M, with each of the majority operators being a function of a plurality of variables that returns a logic value assumed by more than half of the plurality of variables, and a single Boolean variable complementation operator '. The method further comprises providing a commutativity transformation defined by $M(x,y,z)=M(y,x,z)=M(z,y,x)$, wherein $x,y,z$ are Boolean variables; providing a majority transformation ($\Omega$.M) defined by if($x==y$) then $M(x,y,z)=x$ else if($x==y'$) then $M(x,y,z)=z$, wherein $y'$ is the Boolean complement of $y$; providing an associativity transformation ($\Omega$.A) defined by $M(x,u,M(y,u,z))=M(z,u,M(y,u,x))$, wherein also $u$ is a Boolean variable; providing a distributivity transformation ($\Omega$.D) defined by $M(x,y,M(u,v,z))=M(M(x,y,u),M(x,y,v),z)$, wherein also $z$ and $v$ are Boolean variables; providing an inverter propagation transformation ($\Omega$.I) defined by $(M(x,y,z))'=M(x',y',z')$, wherein $x'$ is the Boolean complement of $x$ and $z'$ is the Boolean complement of $z$; providing a relevance transformation ($\Psi$.R) defined by $M(x,y,z)=M(x,y,z_{x/y'})$, wherein the symbol $z_{x/y'}$ represents the logic circuit for variable $z$ wherein the variable $x$ is substituted by variable $y'$ in all its appearance in the circuit of $z$; providing a complementary associativity transformation ($\Psi$.C) defined by $M(x,u,M(y,u',z))=M(x,u,M(y,x,z))$, wherein $u'$ is the Boolean complement of $u$; and providing a substitution transformation ($\Psi$.S) defined by $M(x,y,z)=M(v,M(v',M_{v/u}(x,y,z),u),M(v',M_{v/u'}(x,y,z),u'))$, wherein $v'$ is the Boolean complement of $v$, $M_{v/u}(x,y,z)$ represents the logic circuit for $M(x,y,z)$ having the variable $v$ substituted by the variable $u$ in all its appearance in the circuit of $M(x,y,z)$ and $M_{v/u'}(x,y,z)$ represents the logic circuit for $M(x,y,z)$ having variable $v$ is substituted by variable $u'$ in all its appearance in the circuit of $M(x,y,z)$. The $\Omega$.M, $\Omega$.C, $\Omega$.A, $\Omega$.D, $\Omega$.I, $\Psi$.R, $\Psi$.C and $\Psi$.S transformations are combined to reduce a delay of a logic circuit via (i) a reshaping procedure consisting of the $\Omega$.A, $\Omega$.C, $\Omega$.D, $\Omega$.I, $\Psi$.R, $\Psi$.S and $\Psi$.C transformations, applied either left-to-right or right-to-left moving identical or complemented variables in neighbor locations of the circuit, (ii) a push-up procedure consisting of the $\Omega$.M transformation, applied left-to-right, and the $\Omega$.D transformation, applied left-to-right, the $\Omega$.A transformation and the $\Psi$.C transformation, applied either left-to-right or right-to-left, that move critical late arrival variables close to the circuit outputs, or (iii) an iteration of steps (i) and (ii) till a reduction in delay is achieved.

In a third aspect the invention provides a method for optimizing an implementation of a logic circuit, comprising providing an interpretation of the logic circuit in terms of 3 Boolean variable majority operators M, with each of the majority operators being a function of a plurality of variables that returns a logic value assumed by more than half of the plurality of variables, and a single Boolean variable complementation operator '. The method further comprises providing a commutativity transformation defined by M(x,y,z)=M(y,x,z)=M(z,y,x), wherein x,y,z are Boolean variables; providing a majority transformation (Ω.M) defined by if(x==y) then M(x,y,z)=x else if(x==y') then M(x,y,z)=z, wherein y' is the Boolean complement of y; providing an associativity transformation (Ω.A) defined by M(x,u,M(y,u,z))=M(z,u,M(y,u,x)), wherein also u is a Boolean variable; providing a distributivity transformation (Ω.D) defined by M(x,y,M(u,v,z))=M(M(x,y,u),M(x,y,v),z), wherein also z and v are Boolean variables; providing an inverter propagation transformation (Ω.I) defined by (M(x,y,z))'=M(x',y',z'), wherein x' is the Boolean complement of x and z' is the Boolean complement of z; providing a relevance transformation (Ψ.R) defined by M(x,y,z)=M(x,y,$z_{x/y'}$), wherein the symbol $z_{x/y'}$ represents the logic circuit for variable z wherein the variable x is substituted by variable y' in all its appearance in the circuit of z; providing a complementary associativity transformation (Ψ.C) defined by M(x,u,M(y,u',z))=M(x,u,M(y,x,z)), wherein u' is the Boolean complement of u; and providing a substitution transformation (Ψ.S) defined by M(x,y,z)=M(v,M(v',$M_{v/u}$(x,y,z),u),M(v', $M_{v/u'}$(x,y,z),u')), wherein v' is the Boolean complement of v, $M_{v/u}$(x,y,z) represents the logic circuit for M(x,y,z) having the variable v substituted by variable u in all its appearance in the circuit of M(x,y,z) and $M_{v/u'}$(x,y,z) represents the logic circuit for M(x,y,z) having variable v is substituted by variable u' in all its appearance in the circuit of M(x,y,z). The Ω.M, Ω.C, Ω.A, Ω.D, Ω.I, Ψ.R, Ψ.C and Ψ.S transformations are combined to reduce a power consumption of a logic circuit via (i) a switching activity reduction procedure consisting of the Ω.C, Ψ.R, Ψ.S transformations, applied either left-to-right or right-to-left substituting variables with a probability $p_{old}$ of assuming the logic 1 value with neighbor variables having a probability $P_{new}$ of assuming the logic 1 value if and only if I$p_{new}$−0.5I>I$p_{old}$−0.5I, (ii) a reshaping procedure consisting of the Ω.A, Ω.C, Ω.D, Ω.I, Ψ.R, Ψ.S and Ψ.C transformations, applied either left-to-right or right-to-left moving identical or complemented variables in neighbor locations of the circuit, (iii) an elimination procedure consisting of the Ω.M transformation, applied left-to-right, and the Ω.D transformation, applied right-to-left, that simplify redundant operators or (iv) an iteration of steps (i), (ii) and (iii), in any sequence, till a reduction in power consumption is achieved.

BRIEF DESCRIPTION OF THE DRAWINGS AND TABLES

The invention will be better understood in light of the description of the detailed description of preferred embodiments and in reference to the drawings and tables, wherein FIG. 1 depicts two logic representation examples for MIGs;

FIG. 5A shows a table containing Logic Optimization results and and FIG. 5B shows a table containing synthesis results.

DETAILED DESCRIPTION OF PREFERRED EMBODIMENTS

Figure 1:
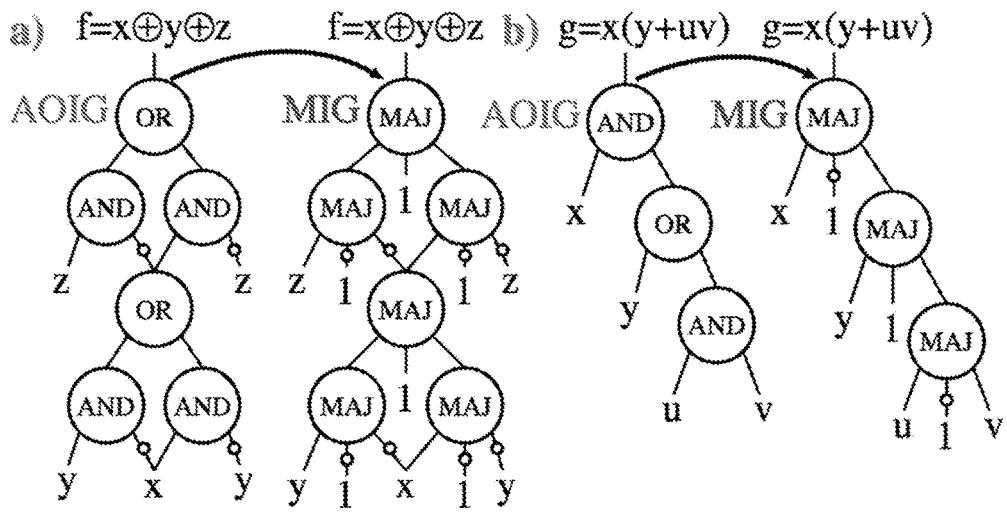

The invention proposes a method to represent and optimize logic by using only majority (MAJ) and inversion (INV) as basis operations. The method makes use of a Majority-Inverter Graph (MIG), a logic representation structure consisting of three-input majority nodes and regular/complemented edges. MIGs include any AND/OR/Inverter Graphs (AOIGs), therefore containing also AIGs (see reference [8]). To provide native manipulation of MIGs, a novel Boolean algebra is introduced, based exclusively on majority and inverter operations. A set of five primitive transformations forms a complete axiomatic system. Using a sequence of such primitive axioms, it is possible to explore the entire MIG representation space. This remarkable property opens up great opportunities in logic optimization and synthesis. The potential of MIGs is shown by proposing a delay-oriented optimization technique. Experimental results, over the MCNC benchmark suite, show that MIG optimization decreases the number of logic levels by 18%, on average, with respect to AIG optimization run by ABC academic tool. Applied in a standard optimization-mapping circuit synthesis flow, MIG optimization enables a reduction in the estimated {delay, area, power} metrics of {22%, 14%, 11%}, on average before physical design, as compared to academic/commercial synthesis flows.

The study of majority-inverter logic synthesis is also motivated by the design of circuits in emerging technologies. In the quest for increasing computational performance per unit area (see reference [9]), majority/minority gates are natively implemented in different nanotechnologies (see references [10]-[12]) and also extend the functionality of traditional NAND/NOR gates. In this scenario, MIGs and their algebra represent the natural methodology to synthesize majority logic circuits in emerging technologies. In the present description, we focus on standard CMOS, to first showcase the interest of MIGs in an ordinary design flow.

Background and Motivation

This section presents relevant background on logic representations and optimization for logic synthesis. Notations and definitions for Boolean algebra and logic networks are also introduced.

Logic Representation and Optimization

Virtually, all digital integrated circuits are synthesized thanks to efficient logic representation forms and associated optimization algorithms (see reference [1]). Early data structures and related optimization algorithms (see reference [2]) are based on two-level representation of Boolean functions in Sum Of Product (SOP) form, which is a disjunction (OR) of conjunctions (AND) where variables can be complemented (INV). Another pioneering data structure is the Binary Decision Diagram (BDD) (see reference [6]): a canonical representation form based on nested if-then-else (MUX) formulas. Later on, multi-level logic networks (see references [3], [4]) emerged, employing AND, OR, INV, MUX operations as basis functions, with more scalable optimization and synthesis tools (see references [4], [7]). To deal with the continuous increase in logic designs complexity, a step further is enabled by reference [5], where multi-level logic networks are made homogenous, i.e., consisting of only AND nodes interconnected by regular/complement (INV) edges. The tool ABC (see reference [8]), which is based on the AND-Inverter Graphs (AIGs), is considered the state-of-art academic software for (large) optimization and synthesis.

The present invention is directed at a new logic optimization paradigm that aims at extending the capabilities of modern synthesis tools.

Notations and Definitions

1) Boolean Algebra: In the binary Boolean domain, the symbol B indicates the set of binary values {0,1}, the symbols ○ and v represent the conjunction (AND) and disjunction (OR) operators, the symbol ' represents the complementation (INV) operator and 0/1 are the false/true logic values. A standard Boolean algebra is a non-empty set (B, ○, v, ', 0, 1) subject to commutativity, associativity, distributivity, identity and complement axioms over ○, v and ' (see reference [16]). Boolean algebra is the ground to operate on logic networks.
2) Logic Network: A logic network is a Directed Acyclic Graph (DAG) with nodes corresponding to logic functions and directed edges interconnecting the nodes. The direction of the edges follow the natural computation from inputs to outputs. The terms logic network, Boolean network, and logic circuit are used interchangeably in this description. The incoming edges of a node link either to other nodes, to input variables or to logic constants 0/1. Two logic networks are said equivalent when they represent the same Boolean function. A logic network is said irredundant if no node can be removed without altering the represented Boolean function. A logic network is said homogeneous if each node has an indegree (number of incoming edges, fan-in) equal to k and represents the same logic function. In a homogeneous logic network, edges can have a regular or complemented attribute, to support local complementation. The depth of a node is the length of the longest path from any input variable to the node. The depth of a logic network is the largest depth of a node. The size of a logic network is its number of nodes.
3) Majority Function: The n-input (n odd) majority function M returns the logic value assumed by more than half of the inputs.

Majority-Inverter Graph

In this section, we present MIGs and their associated Boolean algebra. Notable properties of MIGs are discussed.

A. MIG Logic Representation

Definition: an MIG is a homogeneous logic network with indegree equal to 3 and with each node representing the majority function. In an MIG, edges are marked by a regular or complemented attribute.

We show the properties of MIGs by comparison to the general AND/OR/Inverter Graphs (AOIGs), that are also including the popular AIGs (see reference [8]). For this purpose, note that the majority operator M(a, b, c) behaves as the conjunction operator AND(a, b) when c=0 and as the disjunction operator OR(a,b) when c=1. Therefore, majority can be seen as a generalization of conjunction and disjunction. This property leads to the following theorem.

Theorem 3.1:
MIGs ⊃ AOIGs.
Proof:
In both AOIGs and MIGs, inverters are represented by complemented edge markers. An AOIG node can be seen as a special case of an MIG node, with the third input biased to logic 0 or 1 to realize an AND or OR, respectively. On the other hand, a MIG node is not a special case of an AOIG node, as the functionality of the three input majority cannot be realized by a single AND or OR.

FIG. 1 depicts two logic representation examples for MIGs. They are obtained by translating their optimal AOIG representations into MIGs. Note that even if such logic networks are optimal for AOIGs, they can be further optimized with MIGs, as detailed later. More precisely FIG. 1 show examples of MIG representations (right) for (a) $f=x \oplus y \oplus z$ and (b) $g=x(y+uv)$ derived by transposing their optimal AOIG representations (left). Complement attributes are represented by bubbles on the edges.

As a corollary of Theorem 3.1, MIGs include also AIGs and are capable to represent any logic function (universal representation). This is formalized in the following.

Corollary 3.2:
MIGs ⊃ AIGs.
Proof:
MIGs ⊃ AOIGs ⊃ AIGs = ⇒ MIGs ⊃ AIGs
Corollary 3.3:
MIG is a universal representation form.
Proof:
MIGs ⊃ AIGs that is a universal representation (see reference [5]).

So far, we have shown that MIGs can be configured to behave as AOIGs. Hence, in principle, they can be manipulated using traditional AND/OR techniques. However, the potential of MIGs goes beyond standard AOIGs and, in order to unlock their full expressive power, we introduce a new Boolean algebra, natively supporting the majority/inverter functionality.

B. MIG Boolean Algebra

We propose here a novel Boolean algebra 1, defined over the set (B, M, ', 0, 1), where M is the majority operator of three variables and ' is the complementation operator. The following set of five primitive transformation rules, referred to as Ω, is an axiomatic system for (B, M, ', 0, 1). All the variables considered hereafter belong to B.

$$\Omega \begin{cases} \text{Commutativity} - \Omega.C \\ M(x, y, z) = M(y, x, z) = M(z, y, x) \\ \text{Majority} - \Omega.M \\ \begin{cases} \text{if}(x = y): M(x, y, z) = x = y \\ \text{if}(x = y'): M(x, y, z) = z \end{cases} \\ \text{Associativity} - \Omega.A \\ M(x, u, M(y, u, z)) = M(z, u, M(y, u, x)) \\ \text{Distributivity} - \Omega.D \\ M(x, y, M(u, v, z)) = M(M(x, y, u), M(x, y, v), z) \\ \text{Inverter Propagation} - \Omega.I \\ M'(x, y, z) = M(x', y', z') \end{cases} \quad (1)$$

We prove that (B, M, ', 0, 1) axiomatized by Ω is a Boolean algebra by showing that it induces a complemented distributive lattice (see reference [17]).

Theorem 3.4:
The set (B, M, ', 0, 1) subject to axioms in Ω is a Boolean algebra.
Proof:
The system Ω embed median algebra axioms (see reference [13]). In such scheme, M(0,x,1)=x follows by Ω.M. In reference [18], it is proved that a median algebra with elements 0 and 1 satisfying M(0,x,1)=x is a distributive lattice. Moreover, in our scenario, complementation is well defined and propagates through the operator M (Ω.I). Thus, a complemented distributive lattice arises. Every complemented distributive lattice is a Boolean algebra (see reference [17]).

Note that there are other possible axiomatic systems. For example, it is possible to show that in the presence of Ω.C, Ω.A and Ω.M, the rule in Ω.D is redundant (see reference [14]). In this work, we consider Ω.D as part of the axiomatic system for the sake of simplicity. Desirable properties for a logic system are soundness and completeness. Soundness ensures that if a formula is derivable from the system, then it is valid. Completeness guarantees that each valid formula is derivable from the system. We prove that the proposed Boolean algebra is sound and complete by linking back to Stone's theorem (see reference [19]).

Theorem 3.5:

The Boolean algebra (B, M, ', 0, 1) axiomatized by Ω is sound and complete.

Sketch of the Proof:

Owing to Stone's representation theorem, every Boolean algebra is isomorphic to a field of sets (see reference [19]). Stone's theorem implies soundness and completeness in the original logic system (see reference [20]). Since the proposed system is a Boolean algebra, Stone's duality applies and soundness and completeness are true.

Intuitively, every (M,',0,1)-formula can be interpreted as an MIG. Thus, the Boolean algebra induced by Ω is naturally applicable in MIG manipulations. We show hereafter that any two equivalent MIGs can be transformed one into the other by Ω.

Theorem 3.6:

It is possible to transform any MIG α into any other logically equivalent MIG β, by a sequence of transformations in Ω.

Proof:

Say that α is one-to-one equivalent to the (M, ', 0, 1)—formula A and β is one-to-one equivalent to the (M, ', 0, 1)—formula B. All tautologies in (B, M, ', 0, 1) are theorems provable by Ω [Theorem 3.5]. The statement A=B is equivalent to the tautology M(1, M(A', B', 0), M(A, B, 0))=1 (that means A⊕B=1). Using the sequence in Ω proving M(1, M(A', B', 0), M(A, B, 0))=1 we can then transform MIG α into MIG β.

As a consequence of Theorem 3.6, it is possible to traverse the entire MIG representation space just by using Ω. From a logic optimization perspective, it means that we can always reach a desired MIG starting from any other equivalent MIG. However, the length of the exact transformation sequence might be impractical for modern computers. To alleviate this problem, we derive from Ω three powerful transformations, referred to as Ψ, that facilitate the MIG manipulation task. The first, relevance (Ψ.R), replaces and simplifies reconvergent variables. The second, complementary associativity (Ψ.C), deals with variables appearing in both polarities. The third and last, substitution (Ψ.S), extends variable replacement also in the non-reconvergent case. We represent a general variable replacement operation, say replace x with y in all its appearance in z, with the symbol $z_{x/y}$.

$$\Psi \begin{cases} \text{Relevance} - \Psi.R \\ M(x, y, z) = M(x, y, z_{x/y'}) \\ \text{Complementary Associativity} - \Psi.C \\ M(x, u, M(y, u', z)) = M(x, u, M(y, x, z)) \\ \text{Substitution} - \Psi.S \\ M(x, y, z) = \\ M(v, M(v', M_{v/u}(x, y, z), u), M(v', M_{v/u'}(x, y, z), u')) \end{cases} \quad (2)$$

By showing that Ψ can be derived from Ω, the validity of Ψ follows from Ω soundness.

Theorem 3.7:

The transformations in Ψ follow from Ω.

Proof:

Relevance (Ψ.R): Let S be the set of all the possible primary input combinations for M (x, y, z). Let Sx=y (Sx=y') be the subset of S such that x=y(x=y'). Note that Sx=y∩Sx=y'=∅ and Sx=y∪Sx=y'=S. According to Ω.M, variable z in M(x, y, z) is only relevant for Sx=y'. Thus, it is possible to replace x with y' (x/y') in all its appearance in z, preserving the original functionality.

Complementary Associativity (Ψ.C):
M(x, u, M(u', v, z))=M(M(x, u, u'), M(x, u, v), z) (Ω.D)
M(M(x, u, u'), M(x, u, v), z)=M(x, z, M(x, u, v)) (Ω.M)
Substitution (Ψ.S): We set M(x, y, z)=k for brevity. k=M(v, v',k)=(Ω.M)
=M(M(u, u', v), v', k)=(Ω.M)
=M(M(v', k, u), M(v', k, u'), v)=(Ω.D)
Then, M(v', k, u)=M(v', kv/u, u) (Ψ.R) and
M(v', k, u')=M(v', kv/u', u) (Ψ.R)
Recalling that k=M (x, y, z), we finally obtain: M(x,y,z)=M (v, M(v', Mv/u(x, y, z), u), M(v', Mv/u' (x, y, z), u'))

So far, we have presented the theory for MIGs and their native Boolean algebra. We show now how to optimize an MIG accordingly.

MIG Optimization

The optimization of an MIG, representing a Boolean function, ultimately consists of its transformation into a different MIG, with better figures of merit in terms of area (size), delay (depth), and power (switching activity). In the rest of this section, we present heuristic algorithms to optimize the size, depth and activity of an MIG using transformations from Ω and Ψ.

A. Optimizing the Size of an MIG

To optimize the size of an MIG, we aim at reducing its number of nodes. Node reduction can be done, at first instance, by applying the majority rule. In the novel Boolean algebra domain, that is the ground to operate on MIGs, this corresponds to the evaluation of the majority axiom (Ω.M) from Left to Right (L→R), as M (x, x, z)=x. A different node elimination opportunity arises from the distributivity axiom (Ω.D), evaluated from Right to Left (R→L), as M(x,y,M(u, v,z))=M(M(x,y,u),M(x,y,v),z). By applying repeatedly Ω.ML→R and Ω.DR-L over an entire MIG, we can actually eliminate nodes and thus reduce its size. Note that the applicability of majority and distributivity depends on the peculiar MIG structure. Indeed, there may be MIGs where no direct node elimination is evident. This is because (i) the optimal size is reached or (ii) we are stuck in a local minima. In the latter case, we want to reshape the MIG in order to enforce new reduction opportunities. The rationale driving the reshaping process is to locally increase the number of common inputs/variables to MIG nodes. For this purpose, the associativity axioms (Ω.A, Ψ.C) allow us to move variables between adjacent levels and the relevance axiom ($\Psi$.R) to exchange reconvergent variables. When a more radical transformation is beneficial, the substitution axiom ($\Psi$.S) replaces pairs of independent variables, temporarily inflating the MIG. Once the reshaping process created new reduction opportunities, majority ($\Omega$.M) and distributivity ($\Omega$.D) run again over the MIG simplifying it. Reshape and elimination processes can be iterated over a user-defined number of cycles, called effort. Such MIG-size optimization strategy is summarized in Alg. 1.

---
Algorithm 1

MIG-size Optimization Pseudocode

INPUT: MIG $\alpha$      OUTPUT: Optimized MIG $\alpha$.
for (cycles=0; cycles<effort; cycles++) do $\left.\begin{array}{l}\Omega.M_{L \to R}(\alpha); \Omega.D_{R \to L}(\alpha); \\ \Omega.A(\alpha); \Psi.C(\alpha); \\ \Psi.R(\alpha); \Psi.S(\alpha); \\ \Omega.M_{L \to R}(\alpha); \Omega.D_{R \to L}(\alpha);\end{array}\right\}$reshape $\Big\}$eliminate end for

---

For the sake of clarity, we comment on the MIG-size optimization procedure of a simple example, reported in FIG. 2(a). The input MIG is equivalent to the formula M(x,M(x,z',w),M(x,y,z)), which has no evident simplification by majority and distributivity axioms. Consequently, the reshape process is invoked to locally increase the number of common inputs. Associativity $\Omega$.A swap w and M (x, y, z) in the original formula obtaining M(x, M(x, z', M(x, y, z)), w), where variables x and z are close to the each other. Later, relevance $\Psi$.R applies to the inner formula M(x, z', M(x, y, z)), exchanging variable z with x and obtaining M(x, M(x, z', M(x, y, x)), w). At this point, the final elimination process runs, simplifying the reshaped representation as M(x, M(x, z', M(x, y, x)), w)=M(x, M(x, z', x), w)=M(x, x, w)=x by using $\Omega$.ML$\to$R. The obtained result is optimal.

Note that MIGs resulting from Alg. 1 are irredundant, thanks to the final elimination step. Portions of Alg. 1 can be interlaced with other optimization methods, to achieve a size-recovery phase.

B. Optimizing the Depth of an MIG

To optimize the depth of an MIG, we aim at reducing the length of its critical path. A valid strategy for this purpose is to move late arrival (critical) variables close to the outputs. In order to explain how critical variables can be moved preserving the original functionality, we consider the general case in which a part of the critical path appears in the form M(x,y,M(u,v,z)). If the critical variable is x, or y, no simple move reduce the depth of M(x,y,M(u,v,z)). Whereas, instead, the critical variable belongs to M(u,v,z), say z, depth reduction is achievable. We focus on the latter case, with order tz>tu≥tv>tx≥ty for the variables arrival time (depth). Such order arises from (i) an unbalanced MIG whose inputs have equal arrival times or (ii) a balanced MIG whose inputs have different arrival times. In both cases, z is the critical variable arriving later than u, v, x, y, hence the local depth is tz+2. If we apply the distributivity axiom $\Omega$.D from left to right (L$\to$R), we obtain M(x,y,M(u,v,z))=M(M(x,y,u),M(x,y,v),z) where z is pushed one level up, reducing the local depth to tz+1. Such technique is applicable to a broad range of cases, as all the variables appearing in M (x, y, M (u, v, z)) are distinct and independent. However, a size penalty of one node is introduced. In the favorable cases for which associativity axioms ($\Omega$.A, $\Psi$.C) apply, critical variables can be pushed up with no penalty. Furthermore, where majority axiom applies $\Omega$.ML$\to$R, it is possible to reduce both depth and size. As noted earlier, there exist cases for which moving critical variables cannot improve the overall depth. This is because (i) the optimal depth is reached or (ii) we are stuck in a local minima. To move away from a local minima, the reshape process is useful. Reshape and critical variable push-up processes can be iterated over a user-defined number of cycles, called effort. Such MIG-depth optimization strategy is summarized in Alg. 2.

---
Algorithm 2

MIG-depth Optimization Pseudocode

INPUT: MIG $\alpha$      OUTPUT: Optimized MIG $\alpha$.
for (cycles=0; cycles<effort; cycles++) do $\left.\begin{array}{l}\Omega.M_{L \to R}(\alpha); \Omega.D_{L \to R}(\alpha); \Omega.A(\alpha); \Psi.C(\alpha); \\ \Omega.A(\alpha); \Psi.C(\alpha); \\ \Psi.R(\alpha); \Psi.S(\alpha); \\ \Omega.M_{L \to R}(\alpha); \Omega.D_{L \to R}(\alpha); \Omega.A(\alpha); \Psi.C(\alpha);\end{array}\right\}$reshape $\Big\}$push-up end for

---

Figure 2:
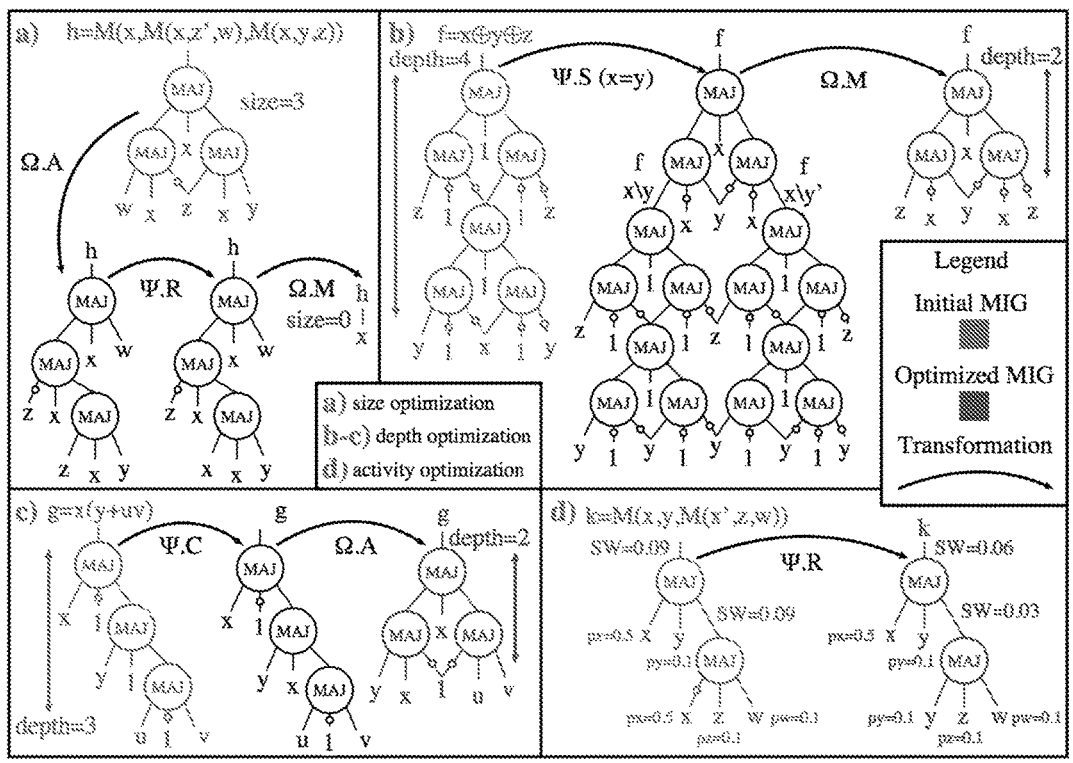
FIG. 2 represents examples of MIG optimization for (a) size, (b-c) depth and (c) switching activity. The initial MIGs appear in purple, and the final MIGs are in blue.

We comment on the MIG-depth optimization procedure using two examples depicted by FIG. 2(b-c). The considered functions are f=x⊕y⊕z and f=x(y+uv) with initial MIG representations translated from their optimal AOIGs. In both of them, all inputs have 0 arrival time, thus no direct push-up operation is advantageous. The reshape process is invoked to move away from local minima. For f=x(y+uv), complementary associativity $\Psi$.C enforces variable x to appear in two adjacent levels, while for f=x⊕y⊕z substitution $\Psi$.S replaces x with y, temporarily inflating the MIG. After this reshaping, the push-up procedure is applicable. For f=x(y+uv), associativity $\Omega$.A exchanges 1' with M(u, 1', v) in the top node, reducing by one level the MIG depth. For f=x⊕y⊕z, majority $\Omega$.ML$\to$R heavily simplifies the structure and reduces by two levels the original MIG depth. The optimized MIGs are much shorter than their optimal AOIGs counterparts. Note that the depth of MIGs resulting from Alg. 2 cannot be reduced by any direct push-up operation.

C. Optimizing the Activity of an MIG

To optimize the overall switching activity of an MIG, we aim at reducing (i) its size and (ii) the probability for nodes to switch from logic 0 to 1, or viceversa. For the size reduction task, we can run the MIG-size optimization algorithm described previously. To minimize the switching probability, we want that nodes do not change values often, i.e., the probability of a node to be logic 1 (p1) is close to 0 or 1. For this purpose, relevance $\Psi$.R and substitution $\Psi$.S can exchange variables with not desirable p1~0.5 with more favorable variables having p1~1 or p1~0. FIG. 2(d) shows an example where relevance $\Psi$.R replaces a variable x having p1=0.5 with a reconvergent variable y having p1=0.1, thus reducing the overall MIG switching activity.

Experimental Results

In this section, we show the advantage of MIG optimization and synthesis as compared to state-of-art academic/commercial tools.

A. MIG Optimization

We present here the experimental method and results for logic optimization based on the MIG theory.

1) Methodology: We developed MIGhty a logic manipulation package for MIGs, consisting of about 6 k lines of C code. Different optimization methods are implemented in MIGhty. In this paper, we employ depth-optimization interlaced with size and activity recovery phases. The MIGhty package reads a Verilog description of a combinational logic circuit, flattened into Boolean primitives, and writes back a Verilog description of the optimized MIG. The benchmarks are the largest circuits from the MCNC suite, ranging from 0.1 k and 15 k nodes. For the sake of illustration, we considered separately a large logic compression circuit having (unoptimized) 0.3M nodes. We compare MIGs with AIGs optimized by ABC tool (see reference [8]) and BDDs decomposed by BDS tool (see reference [7]). The resyn2 script is used for ABC, while the default execution options are used for BDS.

Figure 3:
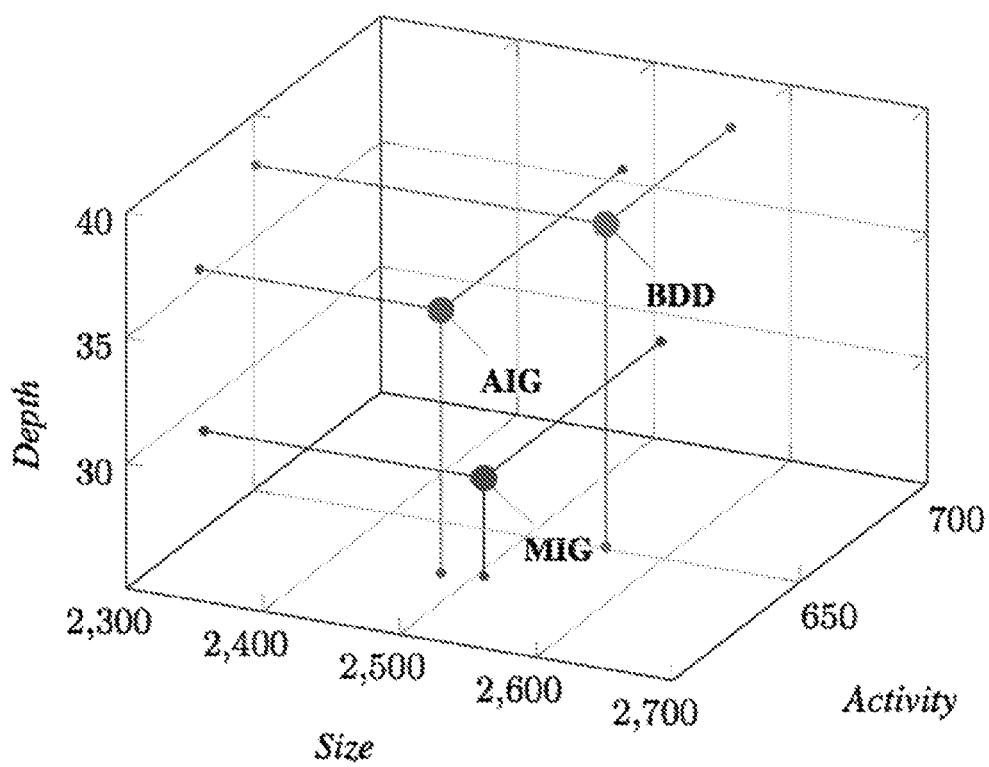
FIG. 3 shows the optimization space for logic circuits optimized with MIG (Blue), AIG (violet) and decomposed BDD (red)

2) Results: Table I-top summarizes experimental results for logic optimization. The average depth of MIGs is 18.6% smaller than AIGs and 23.7% smaller than decomposed BDDs. The average size of MIGs is roughly the same than AIGs, just 0.9% of difference, but 2.1% smaller than decomposed BDDs. The average activity of MIGs is again the same as AIGs, just 0.3% of difference, but 3.1% smaller than decomposed BDDs. FIG. 3 depicts these results in a 3D (size,depth,activity) space. Using a size"depth" activity figure of merit, MIGs are 17.5% better than AIGs and 27.7% better than decomposed BDDs. The runtime for MIGs is slightly longer than B. MIG-Based Synthesis Experimental methods and results for MIG-based logic synthesis are presented hereafter.

1. Methodology: We employ MIGhty in a traditional optimization-mapping synthesis flow and we compare its results to state-of-art academic and commercial tools. For this purpose, a standard cell library consisting of MIN-3, MAJ-3, XOR-2, XNOR-2, NAND-2, NOR-2 and INV logic gates is characterized for CMOS 22 nm technology (see reference [15]). Technology mapping after MIG-optimization is carried out using a proprietary mapping tool. The academic counterpart is ABC (see reference [8]) (AIGs optimization) followed by the same proprietary technology mapping tool as for MIGs. Physical design is not taken into account in any synthesis flow. Hence, {delay, area, power} metrics are estimated from the synthesized gate-level netlist.

Figure 4:
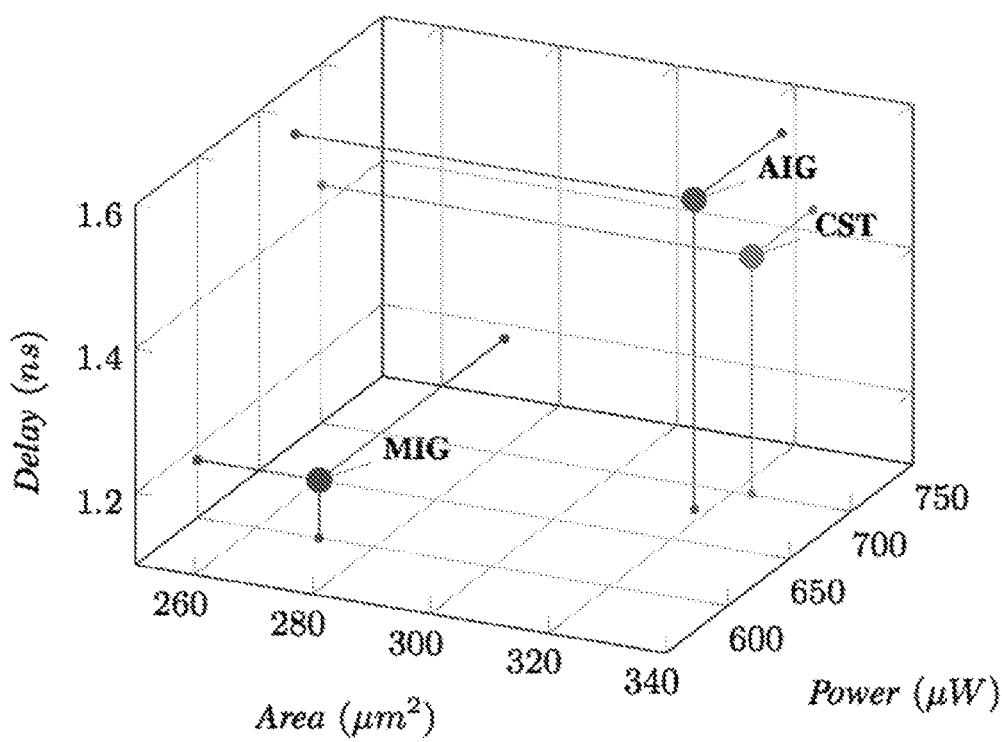
FIG. 4 shows the synthesis space for logic circuits optimized with MIG (blur), AIG (violet) and Commercial Synthesis Tool (CST) (brown)

2. Results: Table 1(b) summarizes experimental results for MIG-based logic synthesis and its counterpart flows. On average, the MIG flow generates {delay, area, power} estimated metrics that are {22%, 14%, 11%} smaller than the best academic/commercial counterpart. FIG. 4 shows the dominance of MIGs synthesis results over AIGs and commercial synthesis tool, in a 3D (area,delay,power) space. While, in logic optimization, MIGs were mainly shorter than AIGs, in logic synthesis they enable also remarkable area and power savings. The reason for such improvement is twofold. On the one hand, the structure of MIGs is further simplifiable by technology mapping algorithms based on Boolean techniques, such as equivalence checking using BDDs, internal flexibilities computation (don't cares), and others. This is especially effective when MIG nodes are partially fed by logic I/O. One the other hand, the presence of MAJ-3 and MIN-3 gates in the standard-cell library allows us to natively recognize and preserve MIG nodes, when their decomposition in simpler functions is not advantageous.

C. Discussions

Experimental results validate the potential of MIGs in logic optimization and synthesis. Even though the proposed algorithms are simple as compared to elaborated state-of-art techniques, they produce already competitive results, thanks to the expressive power of MIGs and their associated algebra. Indeed, there exist logic circuits, for example the ones in FIG. 1 and FIGS. 2($b$-$c$), for which traditional optimization reaches its limits while the proposed methodology can optimize further. In particular, MIGs open the opportunity for efficient synthesis of datapath circuits, where majority logic is dominant.

CONCLUSIONS

As presented in the present description, Majority-Inverter Graph (MIG) is a novel logic representation structure for efficient optimization of Boolean functions. To natively optimize MIGs, we propose a new Boolean algebra, based solely on majority and inverter operations, with a complete axiomatic system. Experimental results, over the MCNC benchmark suite, show that delay-oriented MIG optimization reduces the number of logic levels by 18%, on average, with respect to AIG optimization run by ABC academic tool. Employed in a standard optimization-mapping circuit synthesis flow, MIG optimization enables a reduction in the estimated {delay, area, power} metrics of {22%, 14%, 11%}, on average before physical design, as compared to academic/commercial counterparts. MIGs extend the capabilities of modern synthesis tools, especially with respect to datapath circuits, as majority functions are the ground for arithmetic operations.

REFERENCES

[1] G. De Micheli, Synthesis and Optimization of Digital Circuits, McGraw-Hill, New York, 1994.
[2] R. L. Rudell, A. Sangiovanni-Vincentelli, Multiple-valued minimization for PLA optimization, IEEE Trans. CAD, 6(5): 727-750, 1987.
[3] R. K. Brayton, et al., MIS: A Multiple-Level Logic Optimization System, IEEE Trans. CAD, 6(6): 1062-1081, 1987.
[4] E. Sentovich, et al., SIS: A System for Sequential Circuit Synthesis, ERL, Dept. EECS, Univ. California, Berkeley, UCB/ERL M92/41, 1992.
[5] R. Brayton, A. Mishchenko, ABC: An Academic Industrial-Strength Verification Tool, Proc. CAV, 2010.
[6] R. E. Bryant, Graph-based algorithms for Boolean function manipulation, IEEE Trans. on Comp., C-35(8): 677-691, 1986.
[7] C. Yang and M. Ciesielski, BDS: A BDD-Based Logic Optimization System, IEEE Trans. CAD, 21(7): 866-876, 2002.
[8] ABC synthesis tool—available online.
[9] K. Bernstein et al., Device and Architecture Outlook for Beyond CMOS Switches, Proceedings of the IEEE, 98(12): 2169-2184, 2010.
[10] K. J. Chen, et al., InP-based high-performance logic elements using resonant-tunneling devices, IEEE Electr. Dev. Lett., 17(3): 127-129, 1996.
[11] P. D. Tougaw, C. S. Lent, Logical devices implemented using quantum cellular automata, J. Applied Physics, 75(3): 1811-1817, 1994.
[12] M. De Marchi et al., Polarity control in Double-Gate, Gate-All-Around Vertically Stacked Silicon Nanowire FETs, Proc. IEDM, 2012.

[13] John R. Isbell, Medianalgebra, Trans. Amer. Math. Soc., 319-362, 1980.
[14] D. Knuth, The Art of Computer Programming, Volume 4A, Part 1, New Jersey: Addison-Wesley, 2011
[15] Predictive Technology Models—available online ptm.asu.com.
[16] T. Sasao, Switching Theory for Logic Synthesis, Springer, 1999.
[17] G. Birkhoff, Lattice Theory, Amer. Math. Soc., New York, 1967
[18] G. Birkhoff, A ternary operation in distributive lattices, Bull. of the Amer. Math. Soc., 53 (1): 749752, 1947.
[19] M. Stone, The Theory of Representations of Boolean Algebras, Trans. Amer. Math. Soc. 40: 37-111, 1936.
[20] S. Abramsky, Domain theory in logical form, Annals of Pure and Applied Logic, 51: 177, 1991.

The invention claimed is:

1. A method for optimizing an implementation of a logic circuit for reducing an area of the logic circuit on a chip performed on a computer, the method comprising steps of:
   providing a logic synthesis tool for optimizing the logic circuit;
   expressing the logic circuit based on
      three (3) Boolean variable majority operators M, with each of the majority operators being a function of a plurality of variables that returns a logic value assumed by more than half of the plurality of variables, and
      a single Boolean variable complementation operator ';
   providing a commutativity transformation by the computer defined by M(x,y,z)=M (y,x,z)=M (z,y,x), wherein x, y, z are Boolean variables;
   providing a majority transformation (Ω.M) by the computer defined by if(x==y) then M(x,y,z)=x else if(x==y') then M(x,y,z)=z, wherein y' is the Boolean complement of y;
   providing an associativity transformation (Ω.A) by the computer defined by M(x,u,M(y,u,z))=M(z,u,M(y,u,x)), wherein u is a Boolean variable;
   providing a distributivity transformation (Ω.D) by the computer defined by M(x,y,M(u,v,z))=M(M(x,y,u),M(x,y,v),z), wherein also z and v are Boolean variables;
   providing an inverter propagation transformation (Ω.I) by the computer defined by (M(x,y,z))'=M(x',y',z'), wherein x' is the Boolean complement of x and z' is the Boolean complement of z;
   providing a relevance transformation (Ψ.R) by the computer defined by M(x,y,z)=M(x,y,$z_{x/y'}$), wherein the symbol $z_{x/y'}$ represents the logic circuit for variable z wherein the variable x is substituted by variable y' in all appearances in the circuit of z;
   providing a complementary associativity transformation (Ψ.C) by the computer defined by M(x,u,M(y,u',z))=M(x,u,M(y,x,z)), wherein u' is the Boolean complement of u;
   providing a substitution transformation (Ψ.S) by the computer defined by M(x,y,z)=M(v,M(v',$M_{v/u}$(x,y,z),u),M(v', $M_{v/u}$(x,y,z),u')), wherein v' is the Boolean complement of v, $M_{v/u}$(x,y,z) represents the logic circuit for M(x,y,z) having the variable v substituted by the variable u in all appearances in the circuit of M(x,y,z) and $M_{v/u}$(x,y,z) represents the logic circuit for M(x,y,z) having variable v substituted by variable u' in all appearances in the circuit of M(x,y,z); and
   combining the Ω.M, Ω.C, Ω.A, Ω.D, Ω.I, Ψ.R, Ψ.C and Ψ.S transformations by the computer to reduce an area of the logic circuit to provide for an optimized logic circuit by the steps of,
      (i) reshaping including the Ω.A, Ω.C, Ω.D, Ω.I, Ψ.R, Ψ.C and Ψ.S transformations, applied either left-to-right or right-to-left moving identical or complemented variables in neighbor locations of the logic circuit,
      (ii) eliminating of the Ω.M transformation, applied left-to-right, and the Ω.D transformation, applied right-to-left, to simplify redundant operators, or
      (iii) an iteration of steps (i) and (ii) until a reduction in area of the logic circuit is achieved.

2. The method for optimizing the implementation of the logic circuit of claim 1, wherein in the step of expressing the logic circuit, the logic circuit is provided as a Verilog description of a combinational logic circuit.

3. The method for optimizing the implementation of the logic circuit of claim 1, further comprising the step of:
   writing a Verilog description of the optimized logic circuit by the computer after the step of combining.

4. The method for optimizing the implementation of the logic circuit of claim 1, further comprising the step of:
   synthesizing a gate-level netlist of the optimized logic circuit by the computer after the step of combining.

5. A method for optimizing an implementation of a logic circuit to reduce a delay of the logic circuit performed on a computer, the method comprising steps of:
   providing a logic synthesis tool for optimizing the logic circuit;
   expressing the logic circuit based on
      three (3) Boolean variable majority operators M, with each of the majority operators being a function of a plurality of variables that returns a logic value assumed by more than half of the plurality of variables, and
      a single Boolean variable complementation operator ';
   providing a commutativity transformation by the computer defined by M(x,y,z)=M(y,x,z)=M(z,y,x), wherein x,y,z are Boolean variables;
   providing a majority transformation (Ω.M) by the computer defined by if(x==y) then M(x,y,z)=x else if(x==y') then M(x,y,z)=z, wherein y' is the Boolean complement of y;
   providing an associativity transformation (Ω.A) by the computer defined by M(x,u,M(y,u,z))=M(z,u,M(y,u,x)), wherein u is a Boolean variable;
   providing a distributivity transformation (Ω.D) by the computer defined by M(x,y,M(u,v,z))=M(M(x,y,u),M(x,y,v),z), wherein z and v are Boolean variables;
   providing an inverter propagation transformation (Ω.I) by the computer defined by (M(x,y,z))'=M(x',y',z'), wherein x' is the Boolean complement of x and z' is the Boolean complement of z;
   providing a relevance transformation (Ψ.R) by the computer defined by M(x,y,z)=M(x,y,$z_{x/y'}$), wherein the symbol $z_{x/y'}$ represents the logic circuit for variable z wherein the variable x is substituted by variable y' in all appearances in the circuit of z;
   providing a complementary associativity transformation (Ψ.C) by the computer defined by M(x,u,M(y,u',z))=M(x,u,M(y,x,z)), wherein u' is the Boolean complement of u;
   providing a substitution transformation (Ψ.S) by the computer defined by M(x,y,z)=M(v,M(v',$M_{v/u}$(x,y,z),u), M(v',$M_{v/u}$(x,y,z),d)), wherein v' is the Boolean complement of v, $M_{v/u}(x,y,z)$ represents the logic circuit for $M(x,y,z)$ having the variable v substituted by the variable u in all appearances in the circuit of $M(x,y,z)$ and $M_{v/u}(x,y,z)$ represents the logic circuit for $M(x,y,z)$ having variable v is substituted by variable u' in appearances in the circuit of $M(x,y,z)$; and combining the $\Omega.M$, $\Omega.C$, $\Omega.A$, $\Omega.D$, $\Omega.I$, $\Psi.R$, $\Psi.C$ and $\Psi.S$ transformations by the computer to reduce a delay of a logic circuit to provide for an optimized logic circuit by the steps of,
  (i) reshaping the $\Omega.A$, $\Omega.C$, $\Omega.D$, $\Omega.I$, $\Psi.R$, $\Psi.S$ and $\Psi.C$ transformations, applied either left-to-right or right-to-left moving identical or complemented variables in neighbor locations of the circuit,
  (ii) pushing-up the $\Omega.M$ transformation, applied left-to-right, and the $\Omega.D$ transformation, applied left-to-right, the $\Omega.A$ transformation and the $\Psi.C$ transformation, applied either left-to-right or right-to-left, to move critical late arrival variables close to the circuit outputs, or
  (iii) iterating steps (i) and (ii) until a reduction in the delay of the logic circuit is achieved.

6. The method for optimizing the implementation of the logic circuit of claim 5, wherein in the step of expressing the logic circuit, the logic circuit is provided as a Verilog description of a combinational logic circuit.

7. The method for optimizing the implementation of the logic circuit of claim 5, further comprising the step of:
  writing a Verilog description of the optimized logic circuit by the computer after the step of combining.

8. The method for optimizing the implementation of the logic circuit of claim 5, further comprising the step of:
  synthesizing a gate-level netlist of the optimized logic circuit by the computer after the step of combining.

9. A method for optimizing an implementation of a logic circuit to reduce a power consumption of the logic circuit performed on a computer, comprising steps of:
  providing a logic synthesis tool for optimizing the logic circuit;
  expressing the logic circuit based on
    three (3) Boolean variable majority operators M, with each of the majority operators being a function of a plurality of variables that returns a logic value assumed by more than half of the plurality of variables, and
    a single Boolean variable complementation operator ';
  providing a commutativity transformation by the computer defined by $M(x,y,z)=M(y,x,z)=M(z,y,x)$, wherein x,y,z are Boolean variables;
  providing a majority transformation ($\Omega.M$) by the computer defined by if(x==y) then $M(x,y,z)=x$ else if(x==y') then $M(x,y,z)=z$, wherein y' is the Boolean complement of y;
  providing an associativity transformation ($\Omega.A$) by the computer defined by $M(x,u,M(y,u,z))=M(z,u,M(y,u,x))$, wherein u is a Boolean variable;
  providing a distributivity transformation ($\Omega.D$) by the computer defined by $M(x,y,M(u,v,z))=M(M(x,y,u),M(x,y,v),z)$, wherein also z and v are Boolean variables;
  providing an inverter propagation transformation ($\Omega.I$) by the computer defined by $(M(x,y,z))'=M(x',y',z')$, wherein x' is the Boolean complement of x and z' is the Boolean complement of z;
  providing a relevance transformation ($\Psi.R$) by the computer defined by $M(x,y,z)=M(x,y,z_{x/y'})$, wherein the symbol $z_{x/y'}$ represents the logic circuit for variable z wherein the variable x is substituted by variable y' in all its appearance in the circuit of z;
  providing a complementary associativity transformation ($\Psi.C$) by the computer defined by $M(x,u,M(y,u',z))=M(x,u,M(y,x,z))$, wherein u' is the Boolean complement of u;
  providing a substitution transformation ($\Psi.S$) by the computer defined by $M(x,y,z)=M(v,M(v',M_{v/u}(x,y,z),u),M(v', M_{v/u}(x,y,z),d))$, wherein v' is the Boolean complement of v, $M_{v/u}(x,y,z)$ represents the logic circuit for $M(x,y,z)$ having the variable v substituted by variable u in all appearances in the circuit of $M(x,y,z)$ and $M_{v/u'}(x,y,z)$ represents the logic circuit for $M(x,y,z)$ having variable v is substituted by variable u' in all appearances in the circuit of $M(x,y,z)$; and combining the $\Omega.M$, $\Omega.C$, $\Omega.A$, $\Omega.D$, $\Omega.I$, $\Psi.R$, $\Psi.C$ and $\Psi.S$ transformations by the computer to reduce a power consumption of a logic circuit to provide for an optimized logic circuit with the steps of,
  (i) reducing switching activity including the $\Omega.C$, $\Omega.R$, $\Omega.S$ transformations, applied either left-to-right or right-to-left substituting variables with a probability $p_{old}$ of assuming the logic 1 value with neighbor variables having a probability $p_{new}$ of assuming the logic 1 value only if $|p_{new}-0.5I|>-0.5I$,
  (ii) reshaping including the $\Omega.A$, $\Omega.C$, $\Omega.D$, $\Omega.I$, $\Psi.R$, $\Psi.S$ and $\Psi.C$ transformations, applied either left-to-right or right-to-left moving identical or complemented variables in neighbor locations of the circuit,
  (iii) eliminating including the $\Omega.M$ transformation, applied left-to-right, and the $\Omega.D$ transformation, applied right-to-left, to simplify redundant operators, or
an iteration of steps (i), (ii) and (iii), in any sequence, until a reduction in power consumption of the logic circuit is achieved.

10. The method for optimizing the implementation of the logic circuit of claim 9, wherein in the step of expressing the logic circuit, the logic circuit is provided as a Verilog description of a combinational logic circuit.

11. The method for optimizing the implementation of the logic circuit of claim 9, further comprising the step of:
  writing a Verilog description of the optimized logic circuit by the computer after the step of combining.

12. The method for optimizing the implementation of the logic circuit of claim 9, further comprising the step of:
  synthesizing a gate-level netlist of the optimized logic circuit by the computer after the step of combining.

* * * * *